(No Model.)
J. G. MEYERS.
MECHANICAL MOVEMENT.
No. 312,001. Patented Feb. 10, 1885.
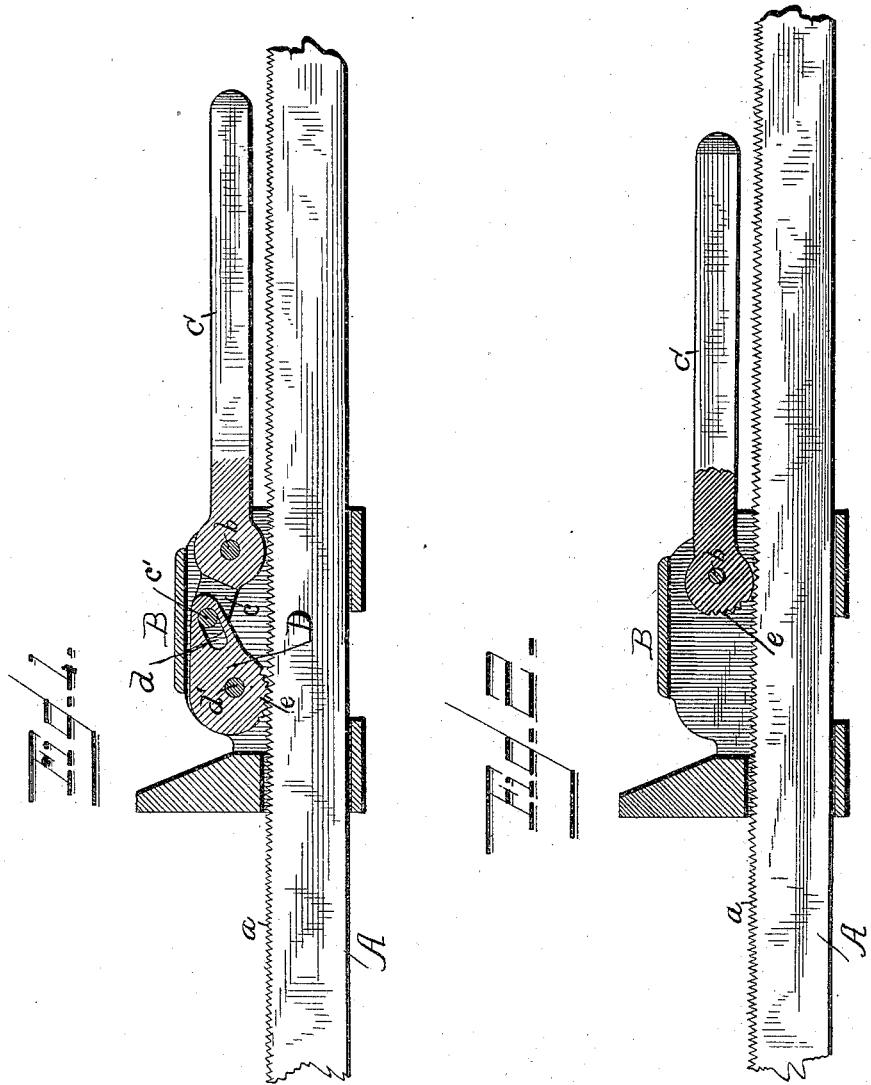
WITNESSES
Jas. L. Falley
C. F. Larrabee
INVENTOR
John G. Meyers
H. F. Ennis, Attorney

UNITED STATES PATENT OFFICE.

JOHN G. MEYERS, OF WASHINGTON, DISTRICT OF COLUMBIA.

MECHANICAL MOVEMENT.

SPECIFICATION forming part of Letters Patent No. 312,001, dated February 10, 1885.

Application filed January 12, 1885. (No model.)

*To all whom it may concern:*

Be it known that I, JOHN G. MEYERS, a citizen of the United States, residing at Washington city, in the District of Columbia, have invented certain new and useful Improvements in Mechanical Movements; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to certain new and useful improvements in mechanical movements; and the object of the device is to provide a mechanical means for adjustably securing a sliding block upon a toothed or serrated bar, and at any suitable point, and attaching and detaching the same with rapidity and facility, whereby the block may be instantly locked at a given point, and, when desired, instantly released; and to these ends the novelty consists in the construction, combination, and arrangements of the parts of the same, as will be hereinafter more fully described, and particularly pointed out in the claims.

In the accompanying drawings the same letters of reference refer to similar parts of the invention.

Figure 1 is a side elevation, partly in section, of my improved mechanical movement, and Fig. 2 is a modification of the same.

A is a bar, its upper side being provided with a series of teeth, *a*.

B is a carriage sliding on the bar A.

C is a hand-lever pivoted in the carriage at *b*, and provided with an arm, *c*, having pin *c'*, which works in a slot, *d*, in the cam D, pivoted in the carriage at *d'*. A portion of the cam D is provided with a series of teeth or serrations, *e*, which correspond to and mesh into the teeth *a* on the bar A when the hand-lever C is in the position shown in Fig. 1. If the lever be raised, its arm *c* and pin *c'* throw the cam D down, so that the teeth thereon will be raised out of contact with the teeth on the bar A, and in this position the carriage may be moved along the bar to any desired point, and by simply pressing the lever C back to its normal position the carriage is clamped rigidly upon the bar.

In the act of clamping the carriage the motion of the cam is such that when the teeth *e* engage the teeth *a* on the bar the carriage is pushed a short distance forward, so that if a jaw or other movable stop were placed on the bar any article placed between it and the carriage would be rigidly clamped between them.

My invention is applicable to a very great variety of uses, such as saw-mill head-blocks, vises, clamps, shears, cutters, and various other devices which will readily suggest themselves to those skilled in the arts pertinent thereto.

In the modification shown in Fig 2 I have dispensed with a separate cam and combined the cam and lever in one. In this case, when the lever is parallel with the bar, the teeth *e* are not in contact with the teeth *a* on the bar, and consequently the carriage can be moved as desired; but if the lever be raised the teeth are brought into contact and the carriage clamped as above described. Of course it is obvious, by referring to Fig. 1, that, if the teeth were dispensed with on the cam and bar, when the cam comes into contact with the bar the enlarged part of the cam would bind on the bar, and by this frictional contact the carriage would be held as rigidly in place as if the teeth were there.

Having thus fully described my invention, what I claim as new and useful, and desire to secure by Letters Patent, is—

1. The combination, with the bar A, of the carriage B, provided with lever C and cam D, substantially as shown and described.

2. The combination, with the bar A, provided with serrations *a*, of the carriage B, having lever C, and the cam D, having serrations *e*, as and for the purpose set forth.

In testimony whereof I affix my signature in presence of two witnesses.

JOHN G. MEYERS.

Witnesses:
 H. J. ENNIS,
 C. F. LARABEE.